(12) United States Patent
Yamashita et al.

(10) Patent No.: US 7,363,190 B2
(45) Date of Patent: Apr. 22, 2008

(54) SENSOR CONTROL CIRCUIT

(75) Inventors: Kazuhiro Yamashita, Miyazaki (JP); Kazuhiro Tomita, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/723,252

(22) Filed: Mar. 19, 2007

(65) Prior Publication Data

US 2007/0282568 A1    Dec. 6, 2007

(30) Foreign Application Priority Data

May 30, 2006   (JP)   ............... 2006-149335

(51) Int. Cl.
*G06F 19/00* (2006.01)
(52) U.S. Cl. ..................... 702/141; 324/512
(58) Field of Classification Search ............... 702/141, 702/182, 185, 188, 176; 324/500, 512
See application file for complete search history.

(56) References Cited

U.S. PATENT DOCUMENTS

2007/0214374 A1* 9/2007 Hempstead et al. ........ 713/300

FOREIGN PATENT DOCUMENTS

JP    2005-091219    4/2005

* cited by examiner

*Primary Examiner*—Edward Raymond
(74) *Attorney, Agent, or Firm*—Donald R. Studebaker; Nixon Peabody LLP

(57) ABSTRACT

A sensor control circuit includes an acceleration sensor which detects acceleration and generates a detection signal. The sensor control circuit also includes a processing section which generates a calculation result by calculating the acceleration in accordance with the detection signal, and generates an interrupt notification. The sensor control circuit also includes an interrupt output circuit. The interrupt output circuit has a threshold value determination section which generates a detection result by determining a change condition. The change condition is determined by comparing the calculation result with the threshold value. The interrupt output circuit also has a plurality of INT terminals and a selection section. The selection section selects the detection result or the interruption notification in accordance with mode information which is set from a host CPU and sends the selected signal from the INT terminal through the associated INT terminal.

12 Claims, 5 Drawing Sheets

FIG. 3

| S37: MODE SIGNAL | S35a: DETECTION RESULT | S34a: INTERRUPT NOTIFICATION | "L" OUTPUT OF NAND GATE 35e (OUTPUT OF INT TERMINAL 35f) | "L" OUTPUT OF NAND GATE 35d (OUTPUT OF INT TERMINAL 35g) |
|---|---|---|---|---|
| "H" | "H" | "H" | | S35a |
| "L" | "H" | "L" | S35a | |
| "H" | "L" | "H" | S34a | |
| "L" | "L" | "L" | | |

FIG. 5

| S47a: MODE SIGNAL | S47b: MODE SIGNAL | S45a: DETECTION RESULT | S34a: INTERRUPT NOTIFICATION | "L" OUTPUT OF NAND GATE 45h (OUTPUT OF INT TERMINAL 45j) | "L" OUTPUT OF NAND GATE 45i (OUTPUT OF INT TERMINAL 45k) |
|---|---|---|---|---|---|
| "H" | "L" | "H" | "H" | S34a | S45a |
| "L" | "H" | "H" | "H" | S45a | S34a |
| "H" | "H" | "H" (or "L") | "L" (or "H") | | S45a (or S34a) |
| "L" | "L" | "H" (or "L") | "L" (or "H") | S45a (or S34a) | |

SENSOR CONTROL CIRCUIT

BACKGROUND OF THE INVENTION

1. Field of the Invention

The present invention relates to a sensor control circuit embodied in the form of an integrated circuit (hereinbelow referred to as "IC") on which a sensor such as an acceleration sensor is mounted, or to a sensor control circuit that controls for example an acceleration sensor. The present invention particularly relates to interruption output whereby interruption processing is performed by supplying for example a sensor measurement result or acceleration detection result to for example a central processing unit (hereinbelow called a "CPU") of a host.

2. Description of the Related Art

Conventionally, acceleration sensors that detect acceleration are employed in various applications. For example, Japanese Patent Application Kokai (Laid-open) No. 2005-91219 discloses a device for detecting dropping of for example portable equipment. This device includes a sensor control circuit having an acceleration sensor.

The dropping detection device having a sensor control circuit disclosed in Japanese Patent Application Kokai No. 2005-91219 is provided in portable equipment such as a digital camera and exercises control such that the portable equipment is brought into a safe state by detecting the falling of the portable equipment and supplying a dropping detection signal to a control section of the portable equipment, before the portable equipment reaches the ground or collides on something. This dropping detection device includes for example: a piezo-resistance element type triaxial acceleration sensor that detects the acceleration in three axial directions; acceleration calculation means that calculates the acceleration using the detection result obtained from the acceleration sensor; and dropping determination means that, based on the calculation result from the acceleration calculation means, compares the weightless condition with a threshold value and determines that dropping is taking place when the weightless condition exceeds the threshold value. The dropping determination means supplies a dropping detection signal to the control section of the portable equipment. The acceleration calculation means and the dropping determination means may be implemented for example by program control of a host CPU.

The conventional method of supplying the measurement results of acceleration obtained by the acceleration sensor to the acceleration calculation means in the host CPU involves either amplifying the sensor output (i.e., an analogue detection signal) and supplying the resulting analogue value, or subjecting the analogue value to analogue/digital conversion (hereinbelow referred to as "A/D conversion") and supplying the resulting digital value. However, in the case of supplying a pure analogue value or A/D converted value, the processing load on the host CPU is heavy. Thus, lightening of the load was sought. Accordingly, an IC was developed whereby all of the processing performed by the host CPU was carried out by a sensor control circuit, only the final conclusion being reported to the host CPU.

FIG. 2 of the accompanying drawings is a layout diagram showing a conventional sensor control circuit 10 embodied in the form of an IC.

The sensor control circuit 10 causes interrupt processing to be performed in a host CPU 20. The sensor control circuit 10 includes an acceleration sensor 11, amplifier circuit (hereinbelow referred to as "AMP") 12, A/D conversion circuit 13, digital processing section 14, a single interrupt terminal (hereinbelow referred to as "INT terminal") 15, and a serial interface (hereinbelow referred to as "serial IF") 16. The digital processing section 14 performs for example acceleration calculation and dropping determination processing.

In the sensor control circuit 10, when the triaxial acceleration is detected by the acceleration sensor 11 and an analogue detection signal is generated, this analogue detection signal is amplified by the AMP 12, and then converted to a digital detection signal by the A/D conversion circuit 13, before being delivered to the digital processing section 14. The digital processing section 14 performs for example acceleration calculation and dropping determination processing using the digital detection signal that is applied thereto.

The data supplying scheme employed for this sensor control circuit 10 is that the acceleration detection condition and the internal processing condition (notification of interrupt) are reported to the host CPU 20 using the single INT terminal 15, and the measurement result is sent to the host CPU 20 using the serial IF 16.

The conventional sensor control circuit 10 shown in FIG. 2 has the following problems (a) and (b):

(a) There is only one INT terminal 15 for notification of the interrupt. In order to receive and process a plurality of reports on a plurality of conditions, therefore, the host CPU 20 must first of all perform factor analysis by reading the content of an interrupt request register, not shown, that is provided for example in the digital processing section 14. Consequently, even when a plurality of measurements are performed by the sensor control circuit 10, the host CPU 20 must give maximum priority to the interrupt request from the sensor control circuit 10 irrespective of whether its order of priority is in fact high or low.

(b) In the case of the sensor control circuit 10 being used for dropping detection, the detection result of acceleration 0 G (G represents the acceleration due to gravity and 0 G represents the weightless condition) and the detection result determined based on the threshold value for the acceleration are of a high degree of urgency since they are used for detection of dropping. Therefore, these detection results must be processed with maximum priority. However, if there are other competing interrupts, the above-mentioned detection result processing is delayed due to either failure to recognize the interrupt concerned (i.e., the interrupt needed for the detection result processing) or lowering of its order of priority.

SUMMARY OF THE INVENTION

According to a first aspect of the present invention, there is provided a sensor control circuit that includes a sensor which detects change in a physical quantity and generates a detection signal, and a processing section which calculates the change in the physical quantity based on the detection signal and generates a calculation result and an interrupt notification. The sensor control circuit also includes an interrupt output circuit.

The interrupt output circuit includes a threshold value determination section which compares the calculation result with a threshold value to determine the change condition of the physical quantity. The threshold value determination section generates a detection result from the change condition of the physical quantity. The interrupt output circuit also includes a plurality of interrupt terminals (ports). The interrupt output circuit separately supplies the detection result and the interrupt notification to an external interrupt processing unit from the interrupt terminals, in accordance with mode information given from the external interrupt processing section.

The sensor control circuit supplies the detection result (i.e., one type of interrupt output) to the external interrupt processing section from one interrupt terminal and supplies the interrupt notification (i.e., another type of interrupt output) to the external interrupt processing section from another interrupt terminal. Therefore, the external interrupt processing section can recognize and process the detection result with maximum priority.

According to a second aspect of the present invention, there is provided another sensor control circuit. This sensor control circuit includes a sensor which detects change in a physical quantity and generates a detection result, and a processing section which calculates the change of the physical quantity using the detection signal and generates a calculation result and an interrupt notification. The sensor control circuit also includes an interrupt output circuit.

The interrupt output circuit includes a threshold value determination section which compares the calculation result with a threshold value, determines the change condition of the physical quantity, and produces a detection result. The interrupt output circuit also includes a plurality of interrupt terminals (ports). Based on mode information given from an external interrupt processing section, the interrupt output circuit supplies the detection result and the interrupt notification from any desired interrupt terminal to the external interrupt processing section. Therefore, this sensor control circuit can supply the interruption notification and/or the detection result to the external interrupt processing section through a desired interrupt terminal, in accordance with a structure and/or processing capability of the external interrupt processing section.

According to a third aspect of the present invention, there is provided still another sensor control circuit that includes an acceleration sensor which detects acceleration and generates a detection signal, and a processing section which calculates the acceleration based on the detection signal and generates the calculation result and an interrupt notification. The sensor control circuit also includes an interrupt output circuit.

The interrupt output circuit has a threshold value determination section which compares the calculation result with a threshold value to determine the change condition and generates a detection result. The interrupt output circuit also has a plurality of interrupt terminals (ports). The interrupt output circuit also has a selection section which selects the detection result or the interrupt notification in accordance with mode information given from an external interrupt processing unit. The interrupt output circuit supplies the selected detection result or interrupt notification to the external interrupt processing unit through a certain interrupt terminal. Different interrupt terminals are used depending upon the mode information given from the external interrupt processing unit.

BRIEF DESCRIPTION OF THE DRAWINGS

FIG. 3 shows a truth-value table of logical levels of the various sections in the interrupt output circuit shown in FIG. 1;

FIG. 5 illustrates a truth-value table of logical levels of the various sections in the interrupt output circuit shown in FIG. 4.

DETAILED DESCRIPTION OF THE INVENTION

First Embodiment

Figure 1:
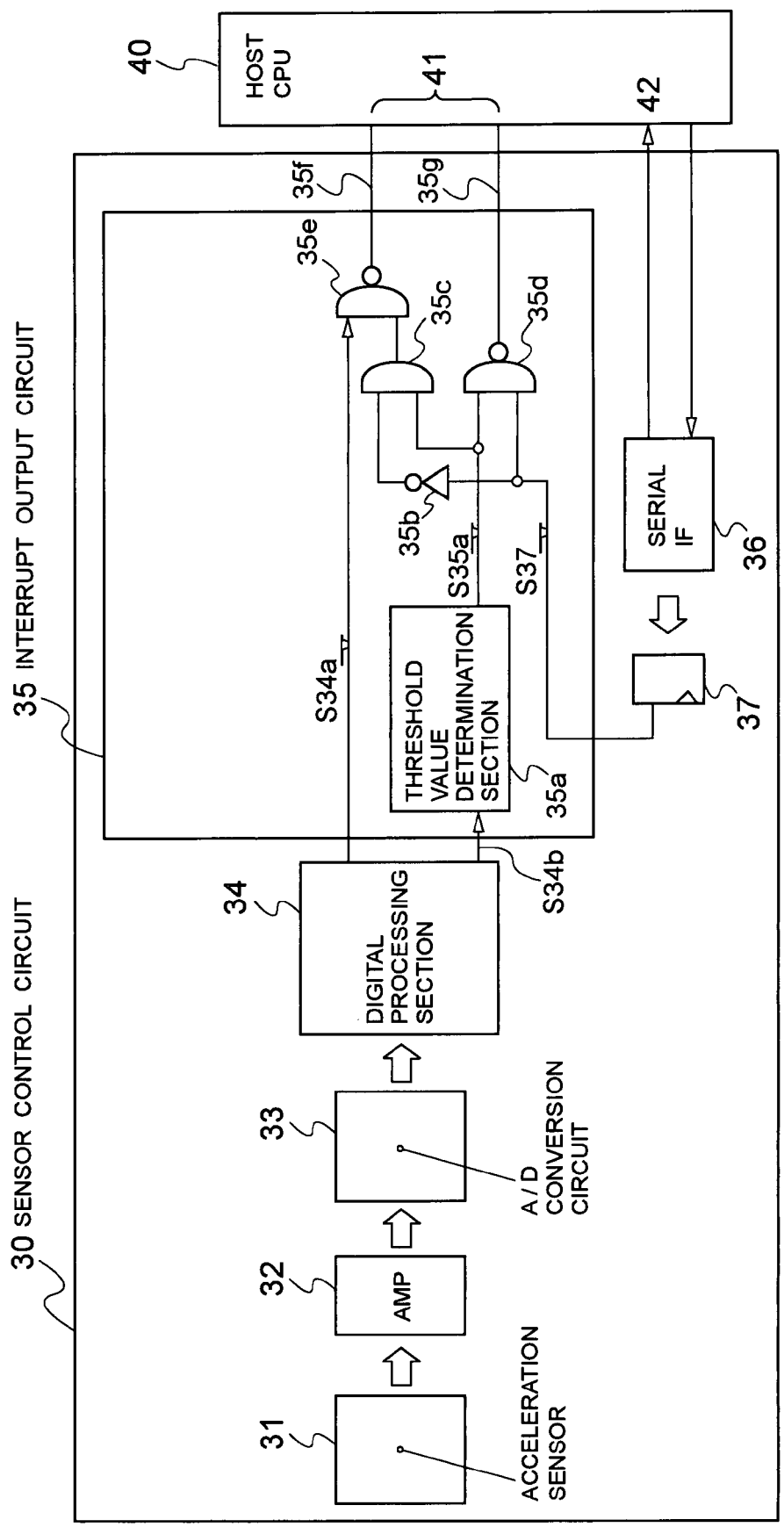
FIG. 1 is a layout diagram of a sensor control circuit according to a first embodiment of the present invention.
Figure 2:
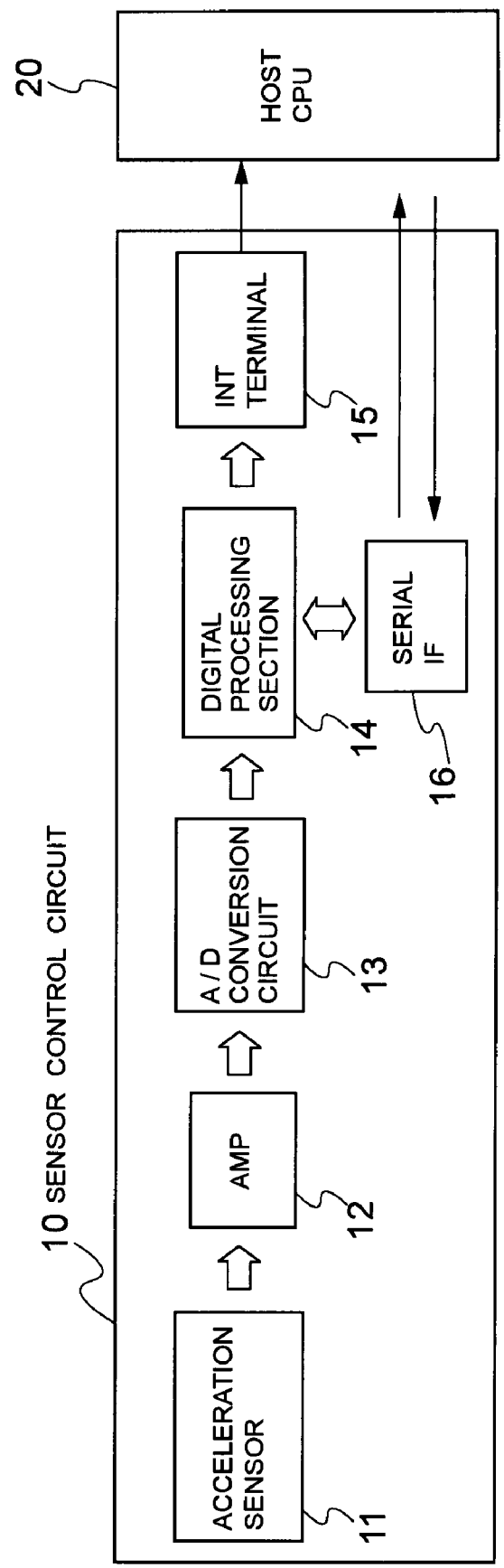
FIG. 2 is a layout diagram of a conventional sensor control circuit.

Referring to FIG. 1, a sensor control circuit of a first embodiment of the present invention will be described.

The sensor control circuit 30 is constructed for example by a single-chip IC. The sensor control circuit 30 performs detection of dropping of a portable personal computer which has an interrupt processing section (for example, a host CPU) 40. The sensor control circuit 30 generates a mode signal S37 settable from the host CPU 40, such as to supply an interrupt output signal and acceleration detection output signal to respective separate INT terminals 35f, 35g.

This sensor control circuit 30 has a sensor (for example, an acceleration sensor that detects triaxial acceleration and generates an analogue detection signal) 31. The sensor control circuit 30 also has processing sections (for example, AMP 32, A/D conversion circuit 33 and digital processing section 34) and an interrupt output circuit 35 which are cascade-connected with the output terminal of the acceleration sensor 31. The input port (hereinbelow referred to as I port) 41 of the host CPU 40 is connected with the output side of the interrupt output circuit 35. An input/output port (hereinbelow referred to as I/O port) 42 of the host CPU 40 is connected with the input side of the interrupt output circuit 35 through a serial IF 36 and flip-flop (hereinbelow called "FF") 37 that issues a mode signal S37.

The AMP 32 is a circuit that amplifies the analogue detection signal. The A/D conversion circuit 33 is a circuit that converts this amplified analogue detection signal to a digital signal. The digital processing section 34 is a circuit that performs digital processing such as acceleration calculation based on the digital signal and supplies the interrupt notification S34a and the acceleration calculation result S34b to the interrupt output circuit 35.

The interrupt output circuit 35 is a circuit that receives the interrupt notification S34a, the acceleration calculation result S34b and the mode signal S37 and generates an "L" (low level) interrupt signal from the INT terminal 35f or 35g and supplies the "L" interrupt signal to the I port 41 of the host CPU 40. The interrupt output circuit 35 has a threshold value determination section 35a that generates a detection signal S35a as to whether or not dropping has taken place by comparing the acceleration calculation result S34b with a prescribed acceleration threshold value. The interrupt output circuit 35 also has a selection section and the INT terminals 35f, 35g.

The selection section includes, for example, an inverter 35b that inverts the mode signal S37, and a logical product gate (hereinbelow referred to as an "AND gate") 35c with two inputs, that calculates the logical product of the output signal of the inverter 35b and the detection result S35a. The selection section also includes a negative logical product gate (hereinbelow referred to as a "NAND gate") 35d with two inputs that calculates the negative logical product of the detection result S35a and mode signal S37. The selection section also includes a 2-input NAND gate 35e that calculates the negative logical product of the interrupt notification S34a and the output of the AND gate 35c. The INT terminal 35f is a terminal that issues an "L" output signal of the NAND gate 35e to the I port 41 of the host CPU 40 as an interrupt signal. The INT terminal 35g is a terminal that issues an "L" output signal of the NAND gate 35d to the I port 41 of the host CPU 40 as an interrupt signal.

The serial IF 36 connected with the I/O port 42 of the host CPU 40 performs inputting/outputting of serial signals in respect of the host CPU 40. This serial IF 36 is connected with the flip-flop 37. The flip-flop 37 is a circuit that holds mode setting information in the output signal of the serial IF 36 and generates a mode signal S37 with a prescribed timing. The output terminal of the flip-flop 37 is connected with the input terminal of the inverter 35b and the input terminal of the NAND gate 35d.

FIG. 3 illustrates a truth-value table of the logical levels of the various sections in the interrupt output circuit 35 shown in FIG. 1.

When the mode setting information for interrupt purposes is supplied to the sensor control circuit 30 from the I/O port 42 of the host CPU 40, this mode setting information is held in the flip-flop 37 after passing through the serial IF 36, and the mode signal S37 is produced from the flip-flop 37 with prescribed timing.

When the mode signal S37 is a high-level (hereinbelow referred to as "H") signal, the NAND gate 35d is opened, the mode signal S37 is inverted by the inverter 35b, and the AND gate 35c is closed. When the NAND gate 35d is opened, the detection result S35a is inverted through the NAND gate 35d and the "L" interrupt signal that is generated from the NAND gate 35d is sent to the I port 41 of the host CPU 40 through the INT terminal 35g.

When the mode signal S37 is a low-level (hereinbelow referred to as "L") signal, the NAND gate 35d is closed, the mode signal S37 is inverted by the inverter 35b and the AND gate 35c is opened. When the AND gate 35c is opened, the detection result S35a passes through the AND gate 35c, with the result that either the output signal of the AND gate 35c or the interrupt notification S34a is selected and inverted by the NAND gate 35e. The "L" interrupt signal that is produced from the NAND gate 35e is then delivered to the I port 41 of the host CPU 40 through the INT terminal 35f.

The acceleration sensor 31 detects the acceleration of the personal computer and generates an analogue detection signal. When the personal computer is in a stationary condition, the acceleration sensor 31 detects 1 G in respect of the weight direction (z axis direction) component. When the personal computer is dropped, the acceleration sensor 31 detects 0 G. This analogue detection signal is amplified by the AMP 32, converted to a digital detection signal by the A/D conversion circuit 33, and delivered to the digital processing section 34. The digital processing section 34 performs digital processing such as calculation of the acceleration based on the input digital detection signal, and generates the acceleration calculation result S34b. The acceleration calculation result S34b is compared with a prescribed acceleration threshold value by the acceleration-threshold comparing section 35a. If the acceleration is greater than the threshold value, falling is identified and a detection result S35a, for example an "H" signal, is issued.

If the NAND gate 35d is opened by the "H" mode signal S37, the "H" detection signal S35a is inverted to an "L" signal by passing through the NAND gate 35d and the resulting signal is then sent to the I port 41 of the host CPU 40 from the INT terminal 35g as an interrupt signal. When this happens, it means that urgency is required. Thus, this interrupt signal is processed with maximum priority by the host CPU 40 and control is exercised so as to bring for example the hard disk of the personal computer into a safe condition. In this way, damage to items such as the hard disk due to impact resulting from dropping of the personal computer can be prevented.

When the AND gate 35c is opened by the "L" mode signal S37, the detection result S35a passes through the AND gate 35c. Either the "H" output signal of the AND gate 35c or the other "H" interrupt notification S34a generated from the digital processing section 34 is selected and inverted by the NAND gate 35e. The "L" interrupt signal that is generated from the NAND gate 35e is delivered to the I port 41 of the host CPU 40 from the INT terminal 35f. In this way, the host CPU 40 performs processing based on the interrupt signal.

Thus, the mode signal S37 is set by the host CPU 40 and acceleration detection is performed by the acceleration sensor 31. As a result of digital processing performed by the digital processing section 34, the detection condition (result) of the acceleration is generated from the INT terminal 35g. If another interrupt notification S34a is generated, the interruption notification S34a or the output of the AND gate 35c is issued from the INT terminal 35f.

With this first embodiment, the interrupt output from the INT terminal 35g that gives notification of the detection condition (result) of the acceleration is separate from the interrupt output from the INT terminal 35f. Therefore, the host CPU 40 can give maximum priority to identification of the detection condition (result) of the acceleration and perform appropriate processing.

Second Embodiment

Figure 4:
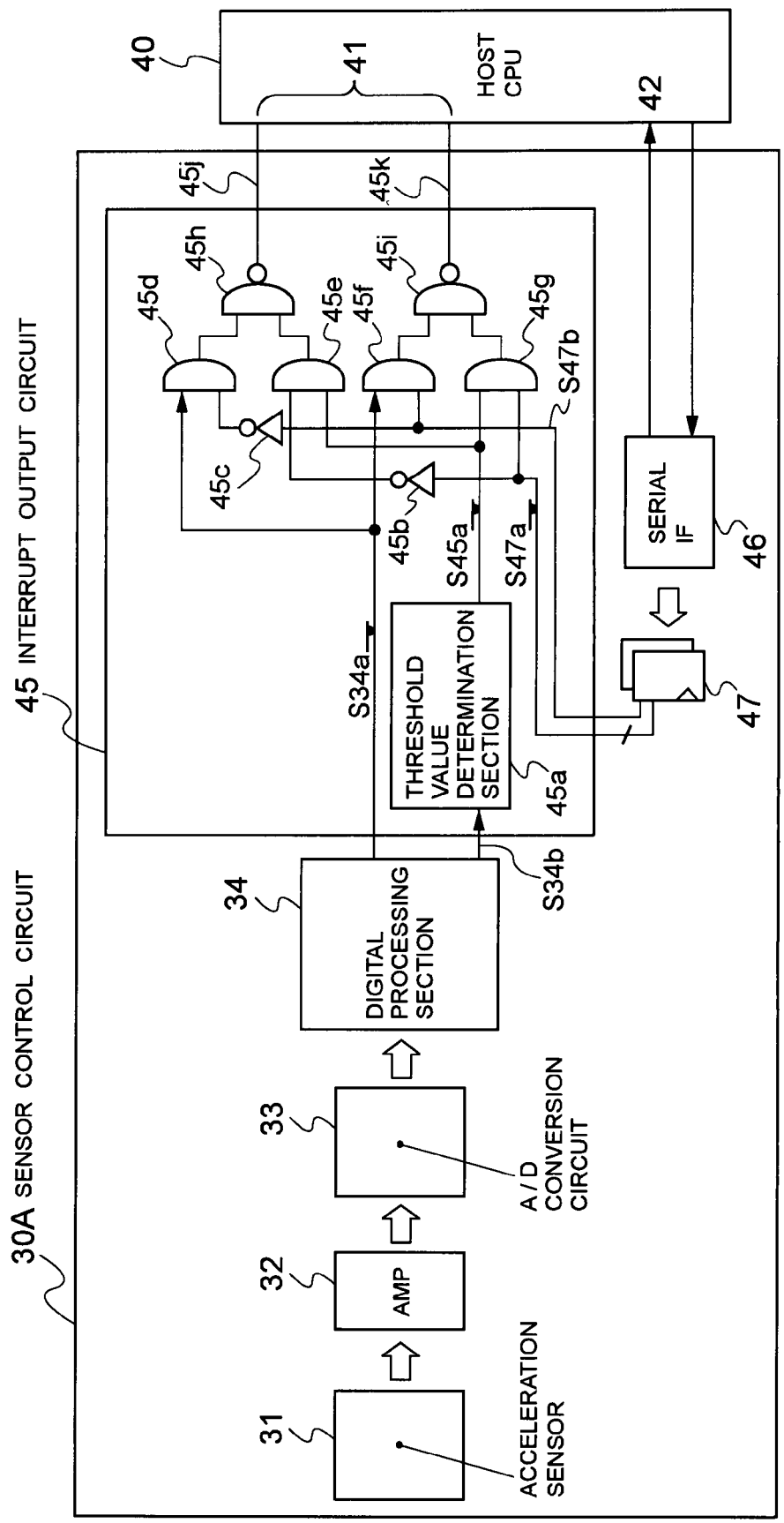
FIG. 4 is a layout diagram of a sensor control circuit according to a second embodiment of the present invention.

FIG. 4 is a diagram of the layout of the sensor control circuit according to the second embodiment of the present invention. Parts and elements that are the same or like as those shown in FIG. 1 are given the same or like reference numerals and symbols.

Similar to the sensor control circuit 30 of the first embodiment, the sensor control circuit 30A of the second embodiment is, for example, a single-chip IC and detects dropping of a personal computer provided with an interrupt processing unit (for example a host CPU) 40. Similar to the first embodiment, the sensor control circuit 30A includes a sensor (for example acceleration sensor) 31 and a processing section (for example AMP 32, A/D conversion circuit 33 and digital processing section 34). The sensor control circuit 30A also includes an interrupt output circuit 45 different from that of the first embodiment, a serial IF 46, and a mode setting and holding register 47. The host CPU 40 can set mode information into the register 47, using the serial IF 46. The sensor control circuit 30A is capable of selectively generating the interrupt or detection condition (result) that is issued from the INT terminal 45j or 45k, depending on the mode information or a value set in the register 47.

The interrupt output circuit 45 receives a plurality of interrupt notifications S34a and the acceleration calculation result S34b that are generated from the digital processing section 34, and a plurality of modes signal S47a, S47b that are generated from the register 47, and supplies an "L" interrupt signal from the INT terminal 45j or 45k to the I port 41 of the host CPU 40. The interrupt output circuit 45 has a threshold determination section 45a that produces the detection result S45a as to whether or not dropping has occurred by comparing the acceleration calculation result S34b with the prescribed acceleration threshold value. The interrupt output circuit 45 also has a selection section and INT terminals 45j, 45k.

The selection section has, for example, an inverter 45b that inverts the mode signal S47a, another inverter 45c that inverts the mode signal S47b, and a 2-input AND gate 45d that calculates the logical product of the interrupt notification S34a and the output signal of the inverter 45c. The selection section also has another 2-input AND gate 45e that calculates the logical product of the output signal of the inverter 45b and the detection result S45a, a 2-input AND gate 45f that calculates the logical product of the interruption notification S34a and mode signal S47b, and a 2-input AND gate 45g that calculates the logical product of the detection result S45a and mode signal S47a. The selection section also has a 2-input NAND gate 45h that calculates the negative logical product of the output signals of the AND gates 45d and 45e, and a 2-input NAND gate 45i that calculates the negative logical product of the output signals of the AND gates 45f and 45g. The INT terminal 45j is a terminal that supplies the "L" output signal of the NAND gate 45h to the I port 41 of the host CPU 40 as an interrupt signal. The INT terminal 45k is a terminal that supplies the "L" output signal of the NAND gate 45i to the I port 41 of the host CPU 40 as an interrupt signal.

The serial IF 46 that is connected with the I/O port 42 of the host CPU 40 performs inputting/outputting of a serial signal with respect to the host CPU 40. The serial IF 46 is connected with the register 47. The register 47 includes a plurality of flip-flops and is a circuit that holds the mode setting information in the output signal of the serial IF 46 and generates a plurality of mode signals S47a, S47b with prescribed timing. The output terminals of the register 47 are connected with the input terminals of the inverters 45b, 45c and with the input terminals of the AND gates 45f, 45g.

FIG. 5 shows a truth-value table of the logical levels of the various sections in the interrupt output circuit 45 of FIG. 4.

When the mode setting information for a plurality of interrupts is sent to the sensor control circuit 30A from the I/O port 42 of the host CPU 40, this mode setting information is held by the register 47 after passing through the serial IF 46, and a plurality of mode signals S47a, S47b are supplied from the register 47 with prescribed timing.

If the mode signals S47a, S47b are "H" signals, the AND gates 45f, 45g are opened, these mode signals S47a, S47b are inverted by the inverters 45b, 45c, and the AND gates 45d, 45e are closed. When the AND gates 45f, 45g are opened, the interrupt notification S34a and detection result S45a pass through the AND gates 45f, 45g, and the "H" signal (S34a or S45a) is selected by the NAND gate 45i and inverted. The "L" interrupt signal that is generated from the NAND gate 45i is sent to the I port 41 of the host CPU 40 through the INT terminal 45k.

If the mode signals S47a, S47b are "L" signals, the AND gates 45f, 45g are closed, the mode signals S47a, S47b are inverted by the inverters 45b, 45c, and the AND gates 45d, 45e are opened. When the AND gates 45d, 45e are opened, the interrupt notification S34a and detection result S45a pass through the AND gates 45d, 45e, the "H" signal (S34a or S45a) is selected by the NAND gate 45h and inverted. The "L" interrupt signal that is generated from the NAND gate 45h is sent to the I port 41 of the host CPU 40 through the INT terminal 45j.

In the same way as in the case of the first embodiment, the acceleration of the personal computer is detected by the acceleration sensor 31, this analogue detection signal is amplified by the AMP 32, the amplified signal is converted to a digital detection signal by the A/D conversion circuit 33 and the digital detection signal is delivered to the digital processing section 34. The digital processing section 34 performs digital processing such as acceleration calculation using the digital detection signal that is received by the digital processing unit 34, and generates the acceleration calculation result S34b. The acceleration calculation result S34b is compared with a prescribed acceleration threshold value by the threshold-acceleration comparing section 45a. If the acceleration is greater than the threshold value, falling is identified and for example an "H" detection result S45a is generated.

When the AND gate 45g is opened by the "H" mode signal S47a and the AND gate 45f is closed by the "L" mode signal 47b, the "H" detection result S45a is inverted to the "L" signal by passing through the AND gate 45g and the NAND gate 45i, and is then delivered to the I port 41 of the host CPU 40 from the INT terminal 45k as an interrupt signal. When this happens, the host CPU 40 understands that urgency is required or an emergent situation happens, and processes this interrupt signal with maximum priority. As a result, control is exercised so as to put for example the hard disk of the personal computer into a safe condition. In this way, damage to items such as the hard disk due to impact resulting from dropping of the personal computer can be prevented.

When the mode signal S47a is an "H" signal and the mode signal S47b is an "L" signal, the "H" mode signal S47a is inverted by the inverter 45b, and the AND gate 45e is closed. Also, the "L" mode signal S47b is inverted by the inverter 45c, and the AND gate 45d is opened. If another "H" interrupt notification S34a is generated from the digital processing section 34, this interrupt notification S34a is inverted by passing through the AND gate 45d and NAND gate 45h, and the resulting "L" interrupt signal is delivered to the I port 41 of the host CPU 40 from the INT terminal 45j. In this way, the host CPU 40 performs processing of the interrupt signal.

Thus, the mode signals S47a, S47b are set by the host CPU 40, detection of acceleration is performed by the acceleration sensor 31, and the acceleration detection condition is set as the result of digital processing performed by the digital processing section 34. The detection condition (result) is then issued from the INT terminal 45j or 45k in accordance with the setting of the mode signals S47a, S47b given from the host CPU 40. If another interrupt notification S34a is generated, this is generated from the INT terminal 45j or 45k in accordance with the setting of the mode signals S47a, S47b from the host CPU 40.

In the second embodiment, the interrupt output and detection condition output can be set arbitrarily in accordance with the construction and/or processing capability of the host CPU 40.

Modifications:

The present invention is not limited to the above described first and second embodiments, and various changes and modifications can be made to the first and second embodiments within the scope of the present invention. Six examples of such changes and modifications will be described below.

(1) In the first and second embodiments, the mode information is set (given) from the host CPU 40 to the sensor control circuit 30, 30A using the serial interface 36, 46, but setting of the mode information from the host CPU 40 is possible directly to the sensor control circuit 30, 30A.

(2) In the first embodiment, the detection result S35a or the interrupt signal of the interrupt notification S34a is selected by controlling the AND gate 35c and NAND gates 35d, 35e with the mode signal S37, but the detection result S35a and the interrupt signal of the interrupt notification S34a may be separately generated.

(3) In the first and second embodiments, two INT terminals 35f, 35g (45j, 45k) are provided, but the present invention can also be applied to the case of an arrangement where three or more INT terminals are provided.

(4) The digital processing sections 34 of the first and second embodiments may be not physically provided; instead, its function may be implemented using for example CPU program control.

(5) In the first and second embodiments, dropping detection is performed in respect of a personal computer having a host CPU 40, but the present invention is also applicable to a circuit that detects acceleration of other types of device or equipment having an interrupt processing section.

(6) The present invention is also applicable to a sensor control circuit that generates as an interrupt signal the detection signal of another sensor such as a temperature sensor, instead of the acceleration sensor 31.

This application is based on Japanese Patent Application No. 2006-149335 filed on May 30, 2006 and the entire disclosure thereof is incorporated herein by reference.

What is claimed is:

1. A sensor control circuit comprising:
a sensor which detects change in a physical quantity and generates a detection signal;
a processing section which calculates the change in the physical quantity based on the detection signal and generates a calculation result and an interrupt notification; and
an interrupt output circuit which includes a threshold value determination section and a plurality of interrupt terminals, wherein the threshold value determination section generates a detection result by comparing the calculation result with a threshold value and determining a change condition of the physical quantity, and the interrupt output circuit separately supplies the detection result and/or the interrupt notification from the plurality of interrupt terminals, respectively, to an external interrupt processing section, in accordance with mode information given from the external interrupt processing section.

2. The sensor control circuit according to claim 1, wherein the plurality of interrupt terminals are first and second terminals, the external interrupt processing section gives first or second mode information, the interrupt output circuit which includes a selection section which selects the detection result or the interrupt notification, based on the first or second mode information given from the external interrupt processing section, the interrupt output circuit supplies the selected detection result or interrupt notification from the first or second interrupt terminal to the external interrupt processing section, the first interrupt terminal is used when the first mode information is given, and the second interrupt terminal is used when the second mode information is given.

3. The sensor control circuit according to claim 1, wherein the sensor is an acceleration sensor which detects acceleration and the detection signal is an acceleration detection signal.

4. The sensor control circuit according to claim 1, wherein the sensor control circuit is constituted by a single-chip integrated circuit.

5. The sensor control circuit according to claim 1, wherein the external interrupt processing section is included in a portable equipment.

6. The sensor control circuit according to claim 1, wherein the sensor is a temperature sensor and the detection signal is a temperature detection signal.

7. A sensor control circuit comprising:
a sensor which detects change in a physical quantity and generates a detection signal;
a processing section which calculates the change in the physical quantity based on the detection signal and generates a calculation result and an interrupt notification; and
an interrupt output circuit which includes a threshold value determination section and a plurality of interrupt terminals, wherein the threshold value determination section determines a change condition of the physical quantity by comparing the calculation result with a threshold value and generates a detection result, the interrupt output circuit supplies the detection result and/or the interrupt notification to an external interrupt processing section through a desired one of the plurality of interrupt terminals in accordance with mode information given from the external interrupt processing section.

8. The sensor control circuit according to claim 7, wherein the interrupt output circuit further includes a selection section which selects the detection result or the interrupt notification based on the mode information given from the external interrupt processing section, and sends the selected detection result or interrupt notification from the desired one of the plurality of interrupt terminals to the external interrupt processing section.

9. The sensor control circuit according to claim 7, wherein the sensor is an acceleration sensor which detects acceleration and the detection signal is an acceleration detection signal.

10. The sensor control circuit according to claim 7, wherein the sensor control circuit is constituted by a single-chip integrated circuit.

11. The sensor control circuit according to claim 7, wherein the external interrupt processing section is included in a portable equipment.

12. The sensor control circuit according to claim 7, wherein the sensor is a temperature sensor and the detection signal is a temperature detection signal.

* * * * *